Dec. 11, 1956 N. W. FOWLER ET AL 2,773,426

GEAR CUTTING MACHINE

Filed Sept. 25, 1951 9 Sheets-Sheet 1

INVENTORS
NORMAN W. FOWLER
LEONARD C. MICHELSON
BY
Richard W. Treverton
ATTORNEY INVENTORS
NORMAN W. FOWLER
LEONARD C. MICHELSON
BY
Richard W. Treverton
ATTORNEY INVENTORS
NORMAN W. FOWLER
LEONARD C. MICHELSON
BY Richard W. Treverton
ATTORNEY INVENTORS
NORMAN W. FOWLER
LEONARD C. MICHELSON
BY
Richard W. Treverton
ATTORNEY GEAR CUTTING MACHINE
Filed Sept. 25, 1951 9 Sheets-Sheet 5
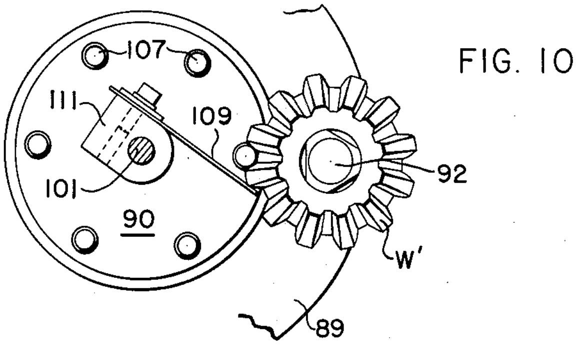
FIG. 10
FIG. 8
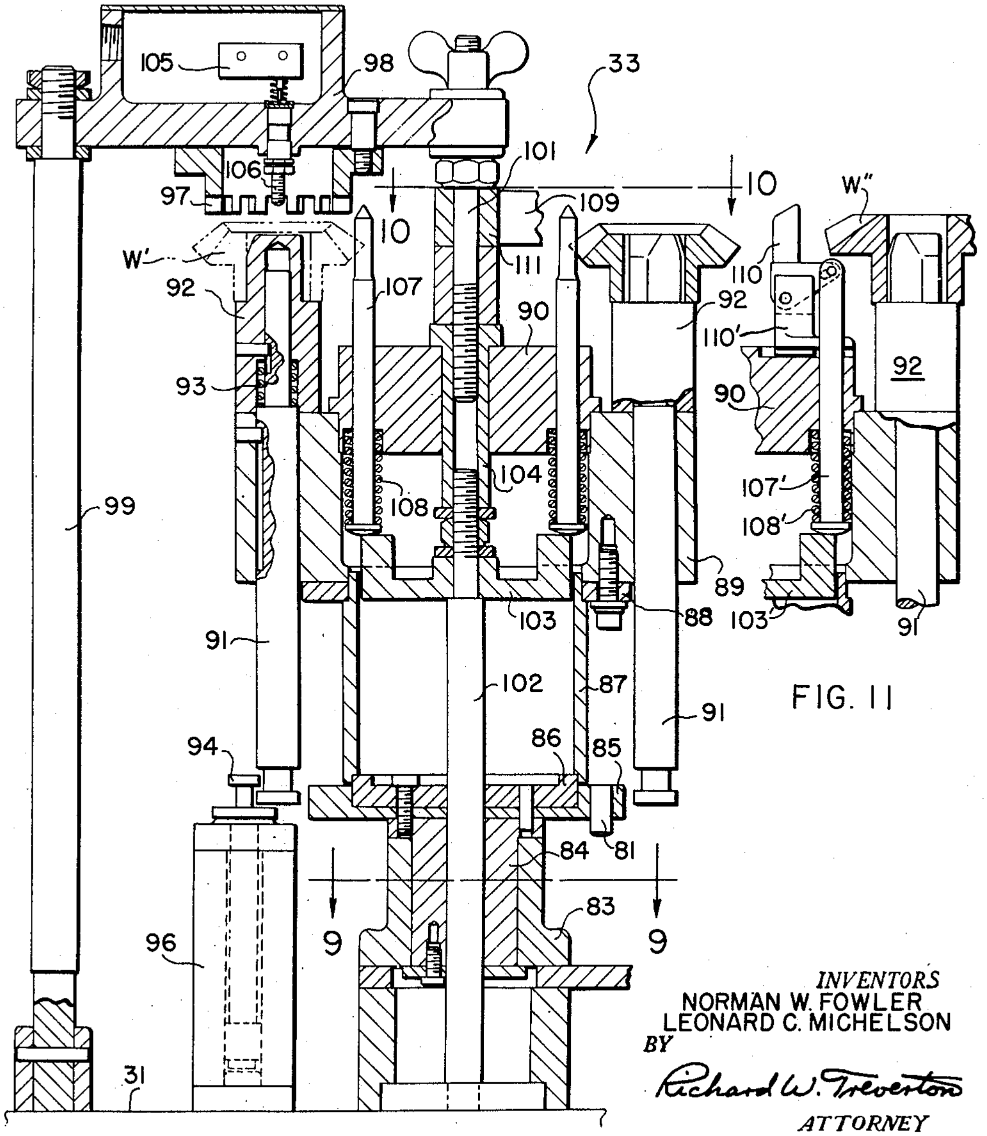
FIG. 8, FIG. 11
INVENTORS
NORMAN W. FOWLER
LEONARD C. MICHELSON
BY
Richard W. Treverton
ATTORNEY

GEAR CUTTING MACHINE

Filed Sept. 25, 1951 9 Sheets-Sheet 6

INVENTORS
NORMAN W. FOWLER
LEONARD C. MICHELSON
BY
Richard W. Treverton
ATTORNEY Dec. 11, 1956 N. W. FOWLER ET AL 2,773,426

GEAR CUTTING MACHINE

Filed Sept. 25, 1951 9 Sheets-Sheet 7

INVENTORS
NORMAN W. FOWLER
LEONARD C. MICHELSON
BY
Richard W. Treverton
ATTORNEY

GEAR CUTTING MACHINE

Filed Sept. 25, 1951

INVENTORS
NORMAN W. FOWLER
LEONARD C. MICHELSON
BY
Richard W. Treverton
ATTORNEY

GEAR CUTTING MACHINE

*INVENTORS*
NORMAN W. FOWLER
LEONARD C. MICHELSON
*BY* Richard W. Treverton
*ATTORNEY*

2,773,426

GEAR CUTTING MACHINE

Norman W. Fowler and Leonard C. Michelson, Brighton, N. Y., assignors to The Gleason Works, Rochester, N. Y., a corporation of New York Application September 25, 1951, Serial No. 248,158

23 Claims. (Cl. 90—1)

The present invention relates to a gear cutting machine of the general type disclosed in patent application Serial No. 22,436 filed by L. O. Carlsen and N. W. Fowler on April 21, 1948, now Patent No. 2,589,475, granted March 18, 1952.

The machine there disclosed includes a spindle for the work piece or gear blank to be cut, a rotary cutter for cutting tooth spaces on the blank, and an automatically operated carrier that is moved during each loading cycle to carry a completed gear from the spindle to an unloading station and then to carry a new blank from a loading station to the spindle. The carrier is operated by hydraulic means controlled by an electrically operated sequence valve, the electrical system being so arranged that a cutting cycle of the machine is begun at the conclusion of each loading cycle, and a loading cycle is commenced at the end of each cutting cycle. The machine is of a type wherein one tooth space is cut during each revolution of the cutter, the latter rotating continuously during the cutting cycle and the work spindle indexing, to advance the work by one tooth, each time a gap between the last and first blades of the cutter comes opposite the work.

Because of the limited number of blades that it is practical to provide around a rotary cutter and the limited amount of stock each blade can remove in one pass through the work, it has been necessary to cut gears of large pitch in two operations, the first operation being performed with a cutter having roughing blades only and the second with a cutter having semi-finishing and finishing blades. Whether the two operations are preformed on one machine or on two, operator time is consumed in handling the gears between the roughing and finishing operations.

The present invention provides a dual machine having a roughing unit and a finishing unit, each of which is similar to the machine of said application Serial No. 22,436. The two units are so arranged that gears are roughed in the first and then are transferred automatically to the second for finishing. Handling of the gears between the two operations is obviated, it being necessary only to place blank work pieces in a loading magazine of the roughing unit and to remove finished work from an unloading magazine of the finisher.

A transfer device is arranged to transfer the work between the rougher unloading station, where the roughed gears are deposited by the swinging carrier of the rougher, and the finisher loading station, where the roughed gears are received by the carrier of the finishing unit. The transfer device has a stock dividing means to assure proper alignment of each roughed gear with the finisher carrier, to the end that the gear will be mounted on the work spindle of the finisher in proper alignment with the finishing cutter. A means is also provided to shift the gear slightly, as it contacts the stock dividing means, so that it seats squarely and firmly on the latter.

Further, a means is provided to automatically test each roughed gear while it is on the transfer device, and to stop the machine if the gear is found to be not properly cut. In this way there is prevented such damage to the finishing cutter as would occur, for example, if this cutter were engaged with an incompletely rough cut blank. The transfer device has a step-by-step rotary motion whereby in one step it carries a roughed cut gear to the testing station, and in another step carries it on to the loading station of the finisher.

Each unit has its own hydraulic system having means for operating its swinging carrier, and one of the units also effects the step-by-step advance of the transfer device. A means is provided to co-ordinate electrically the operation of the hydraulic systems of the two units so that the carriers of both swing to and from their stations at the transfer device while the latter is stationary, and so that each step of advance of the transfer device occurs while the arms are adjacent their respective work spindles.

The foregoing and other objects and advantages of the present invention will appear from the following description of the machine shown in the drawings, wherein:

Fig. 8 is a vertical sectional view through the transfer magazine;

Figures 6, 7, 9:
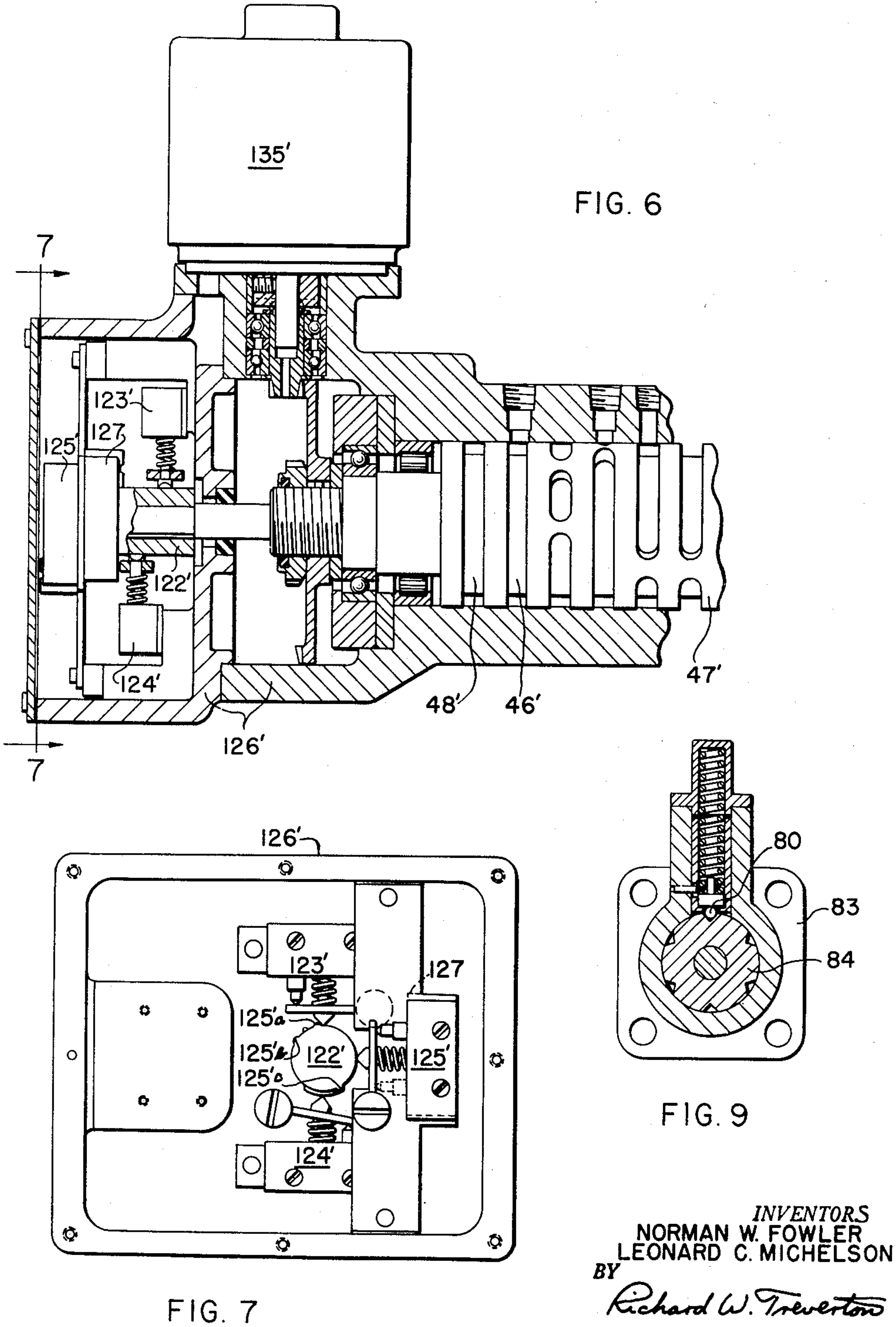
Fig. 6 is a fragmentary sectional view through the sequence valve assembly of the finishing unit.
Fig. 7 is a view taken along line 7—7 of Fig. 6.
Figure 12:
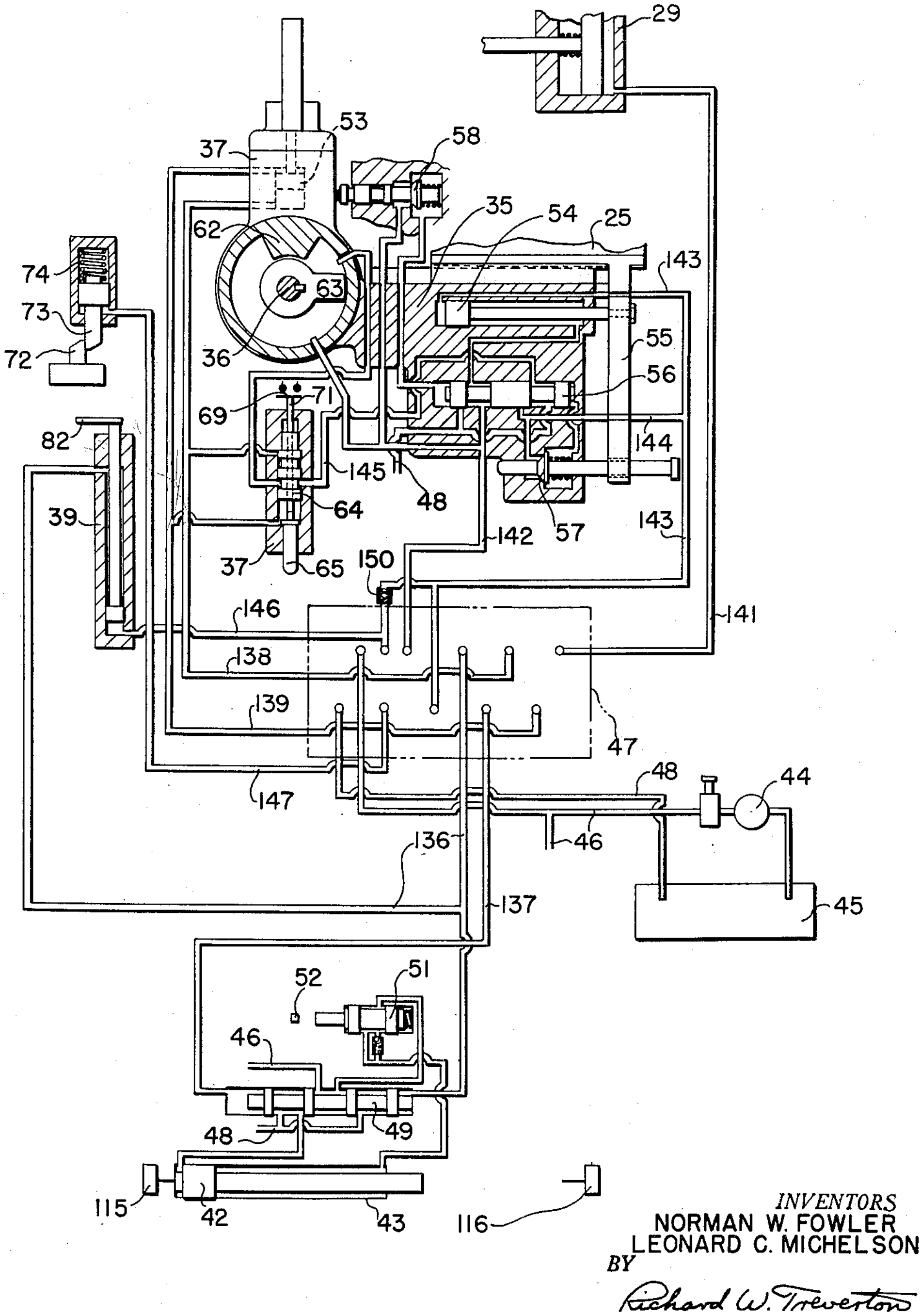
Figure 13:
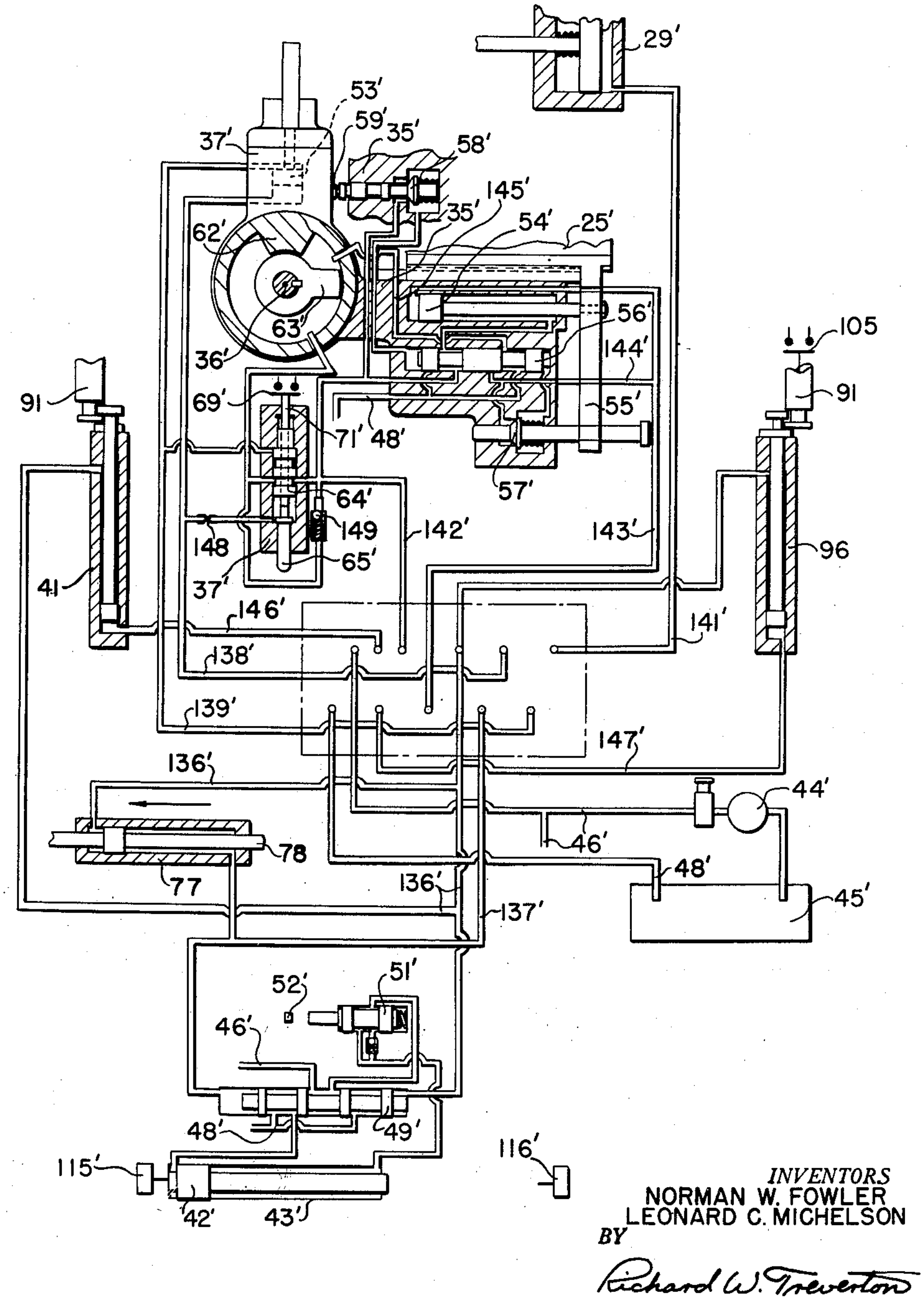
Figure 14:
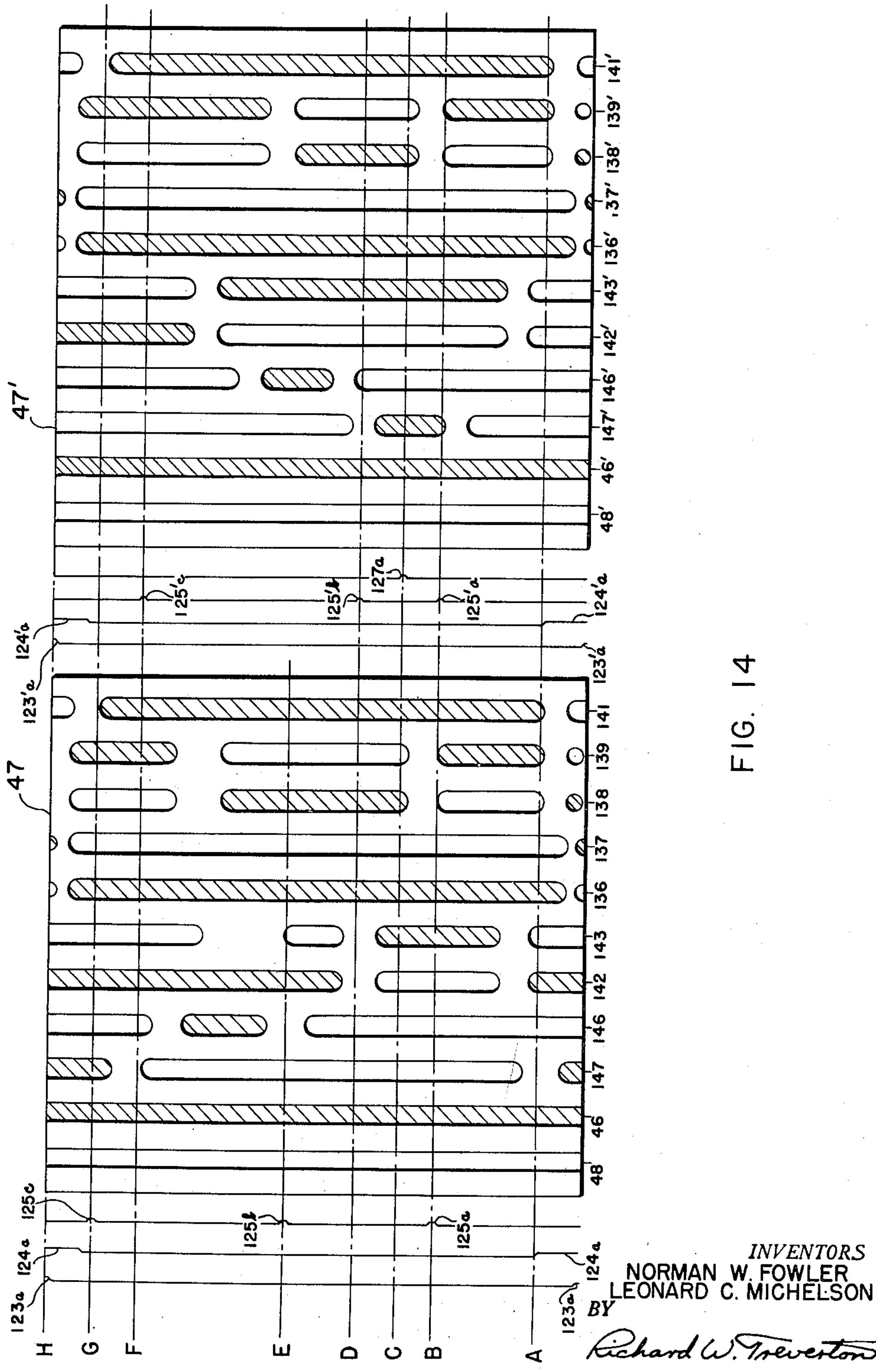
Figure 15:
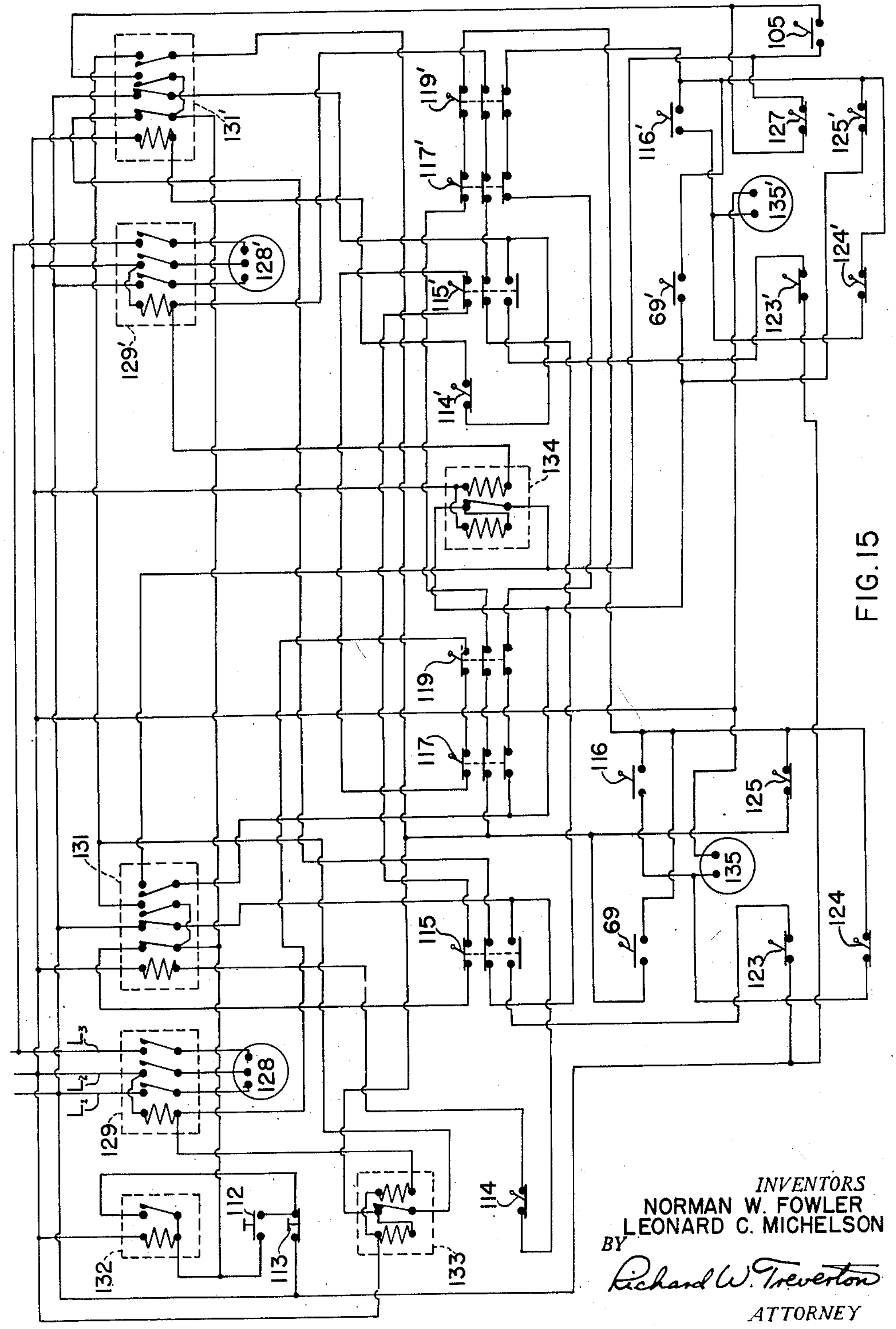

Figs. 9 and 10 are detail sectional views taken respectively along lines 9—9 and 10—10 of Fig. 8;

Fig. 11 is a fragmentary vertical section illustrating a modification of the magazine shown in Fig. 8;

Figs. 12 and 13 are diagrams of the hydraulic systems of the rougher and finisher, respectively;

Fig. 14 is a schematic development of the rougher and finisher sequence valves showing the relationship of the ports of the valves with the lobes of cams that rotate with the valves and operate the limit switches shown in Figs. 6 and 7; and, Fig. 15 is a wiring diagram of the parts of the machine with which the present invention is concerned.

Figure 1:
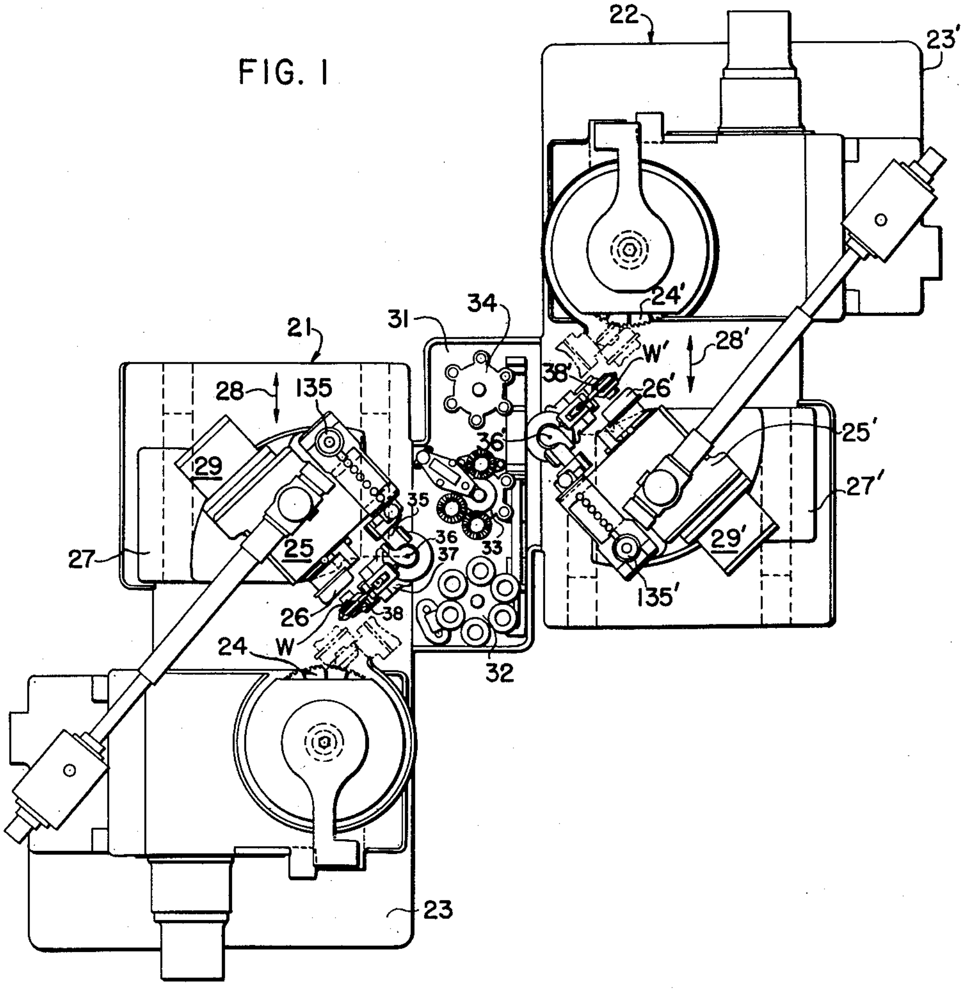
Fig. 1 is a plan view of the whole machine.

As shown in Fig. 1 the machine comprises a roughing unit 21 and a finishing unit 22 which in many respects are similar. In a number of instances the same reference numerals are employed for corresponding parts of the two units, but of these the numerals relating to the finishing unit (or simply "finisher") are primed. Each unit comprises a base 23, a rotary disc cutter 24, and a work head 25 journaling spindle 26 on which the work W is mounted. The work head is carried by a sliding base 27 mounted for reciprocation on the base 23 in the direction of arrow 28. In operation of each unit, after the work has been placed on the spindle and has been chucked thereon by a hydraulic chucking device 29, the sliding base moves in toward the cutter in the direction 28 to bring the work into the path of the blades of the cutter. The cutter rotates and during each revolution cuts one tooth space, the spindle 26 being indexed step-by-step to advance the work one tooth each time a gap between the last and first blades of the cutter comes opposite the work. When all of the tooth spaces of the work have been cut the work head is moved out in the direction 28, away from the cutter, and the work is dechucked by action of the device 29.

Between units 21 and 22 is a tray 31 (Figs. 1 and 2) supporting a loading magazine 32 adapted to contain uncut gear blanks W, a transfer magazine 33 for gears that have been rough cut on the rougher 21, and an unloading magazine 34 for gears W' that have been finish cut on finisher 22. On each head 25 a loader slide 35 is mounted for reciprocation in the direction of the work spindle axis, and to this slide is pivoted, on an upright axis 36, a swinging carrier 37 having pivoted work gripping jaws 38. The jaws are pivoted (Fig. 3) to a member 40 that is rotatable in the carrier and has means (not shown) associated with it for turning it 90° as it swings between its position at the spindle and its positions at the loading and unloading stations. In this way the work piece W is held with its axis horizontal when it is adjacent the work spindle and with its axis vertical when it is at the loading and unloading stations. The general mode of operation is that, between each cutting cycle of the units 21 and 22, the sliding base moves out; then the jaws 38 close on the work and the device 29 operates to dechuck the work; and the loader slide 35 then moves forward on the head 25 to strip the work from the spindle 26. Then the carrier swings about axis 36 to carry the work to an unloading station, this being a position shown in dotted lines in Fig. 2 above transfer magazine 33 in the case of the rougher carrier 37 and a position above the finished work magazine 34 in the case of the finisher carrier 37'; and at such unloading station the jaws 38 open to drop the work onto the magazine. Then the carrier swings to a loading station, this being a position (shown by dash-dot lines in Fig. 2) above blank magazine 32 in the case of the rougher carrier and a position above transfer magazine 33 in the case of the finisher carrier 37'. Next, elevators 39 and 41 raise a blank and rough cut gear respectively from the magazine 32 and 33 into the open jaws 38 and 38'. The jaws then close, the elevators descend, and then each carrier swings to a position adjacent the spindle 26 of its unit. Next the loader slide 35 moves in, placing the work on the spindle; the device 29 operates to chuck the work and the jaws 38 open; then the sliding base 27 moves in, and a new cutting cycle commences.

For moving the sliding base 27 in and out there is a piston 42 (Figs. 12 and 13) secured to the sliding base and arranged to operate in a cylinder 43 on the base 23. Pressure for operating this piston and other hydraulically operated devices on the machine is supplied by an electric motor operated pump 44 which draws hydraulic fluid from a sump 45 and forces it through a line 46 to an electric motor rotated sequence valve 47 (Figs. 6, 12, 13 and 14) from which it is distributed to the hydraulically operated devices. Return of the fluid to the sump is through an exhaust line 48.

The sliding base piston is further controlled by an hydraulically actuated shuttle valve 49, and by a spring backed dash-pot valve 51 which is closed gradually by an abutment 52 on the sliding base as the latter approaches its full out or loading position. A check valve is arranged in by-pass relation to the dash-pot valve to enable full application of pressure to the piston 42 at the beginning of its in movement.

The work gripping jaws 38 (Figs. 1, 2 and 3) are opened and closed by a piston 53 (Figs. 12 and 13) in a cylinder provided within carrier 37, this piston being controlled by the sequence valve 47. The loader slide 35 has a cylinder for a piston 54 which is secured to a bracket 55 on the work head 25. This piston is controlled by a shuttle valve 56, which is controlled by spring closed poppet valves 57 and 58. Valve 57 is slidable in the loader slide 35 and is opened by engagement with bracket 55 when the slide approaches its full out position (when, for example, it has moved to strip a gear from the spindle). Valve 58 which is reciprocable in the loader slide 35, is opened only when the carrier 37 has been rotated about its axis 36 to its limit position adjacent the work spindle 26. At this time a projection 59 on an arm 61 that moves with the carrier, engages and opens the valve 58 (see Fig. 5).

Figure 2:
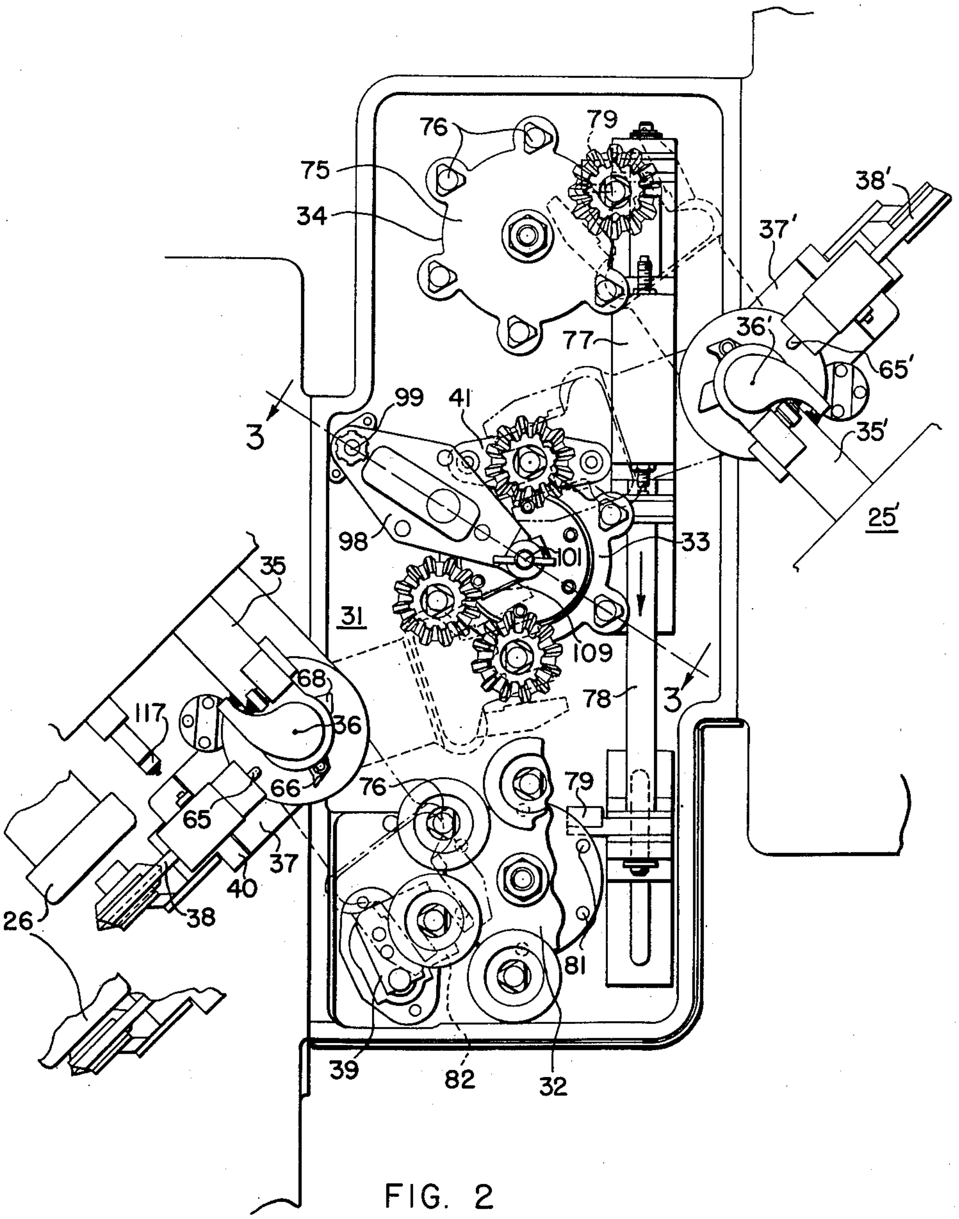
Fig. 2 is a plan view on a larger scale of the loading and transfer parts of the machine.
Figure 5:
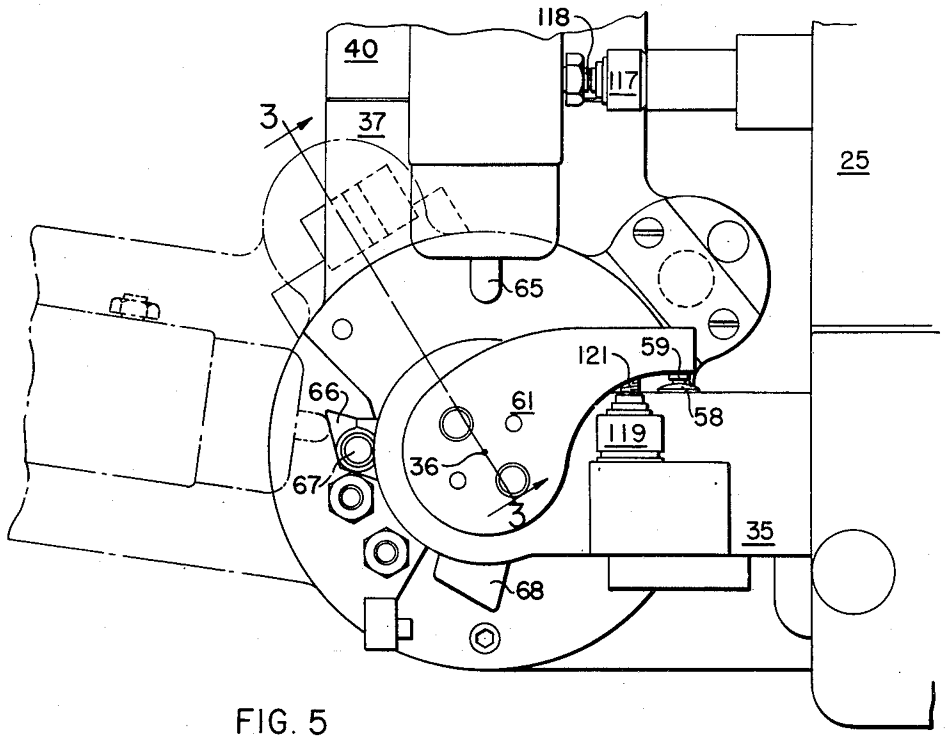
Fig. 5 is a fragmentary plan view of the parts of the hub of the swinging carrier.

The carrier is swung about its axis by an hydraulic actuator (Figs. 12 and 13) which includes a vane piston 62 movable with the carrier and a vane piston 63 stationary with respect to the loader slide 35. This actuator is controlled by the shuttle valve 56 and by a positioning or spot valve 64 that is mounted with a valve chamber in the carrier 37 and is actuated both by pressure (under control of sequence valve 47) and by a cam operated plunger 65. As best shown in Figs. 2 and 5 the plunger 65 of the rougher is adapted to ride up on a pivoted cam 66, to move valve 64 to its middle position, wherein it closes off the passage through it, when the carrier 35 is at its loading station (the dash-dot line position) and is moving toward its position (shown in full lines) at the work spindle. When the carrier is swinging in the opposite direction the cam 66 turns on its pivotal connection 67 to the loader slide and allows the plunger to move idly by. When the carrier swings to its unloading station the plunger 65 of the rougher rides up on a stationary cam 68 on the loader slide. This cam is shallower than pivoted cam 66 and therefore does not serve to fully close valve 64 but it does move the plunger far enough to close a limit switch 69 (Figs. 12 and 13). To enable actuation of this switch a rod 71 extends axially through valve 64.

As shown in Fig. 2, the corresponding pivoted cam 66' of the finisher is oppositely sloped, so as to close spot valve 64' when the carrier is at its unloading station and is swinging away from the work spindle. On the reverse swing the cam 66' pivots to allow the plunger 65' to pass idly by.

Figures 3, 4:
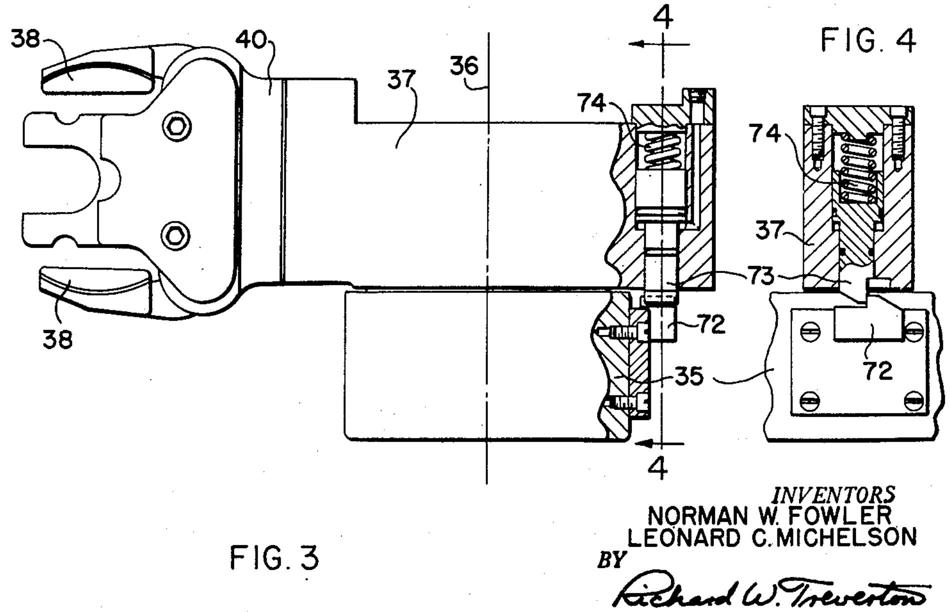
Fig. 3 is a side elevational view of the swinging carrier of the rougher unit, the view being partly in section taken along the line 3—3 of the broken line illustration in Fig. 5.
Fig. 4 is a vertical section taken along line 4—4 of Fig. 3, showing a latch means for holding the rougher carrier at its loading station.

As shown in Figs. 3, 4 and 12 the rougher (but not the finisher) has on its loader slide 35 a detent 72 that is engaged by a latch 73 carried by the swinging carrier 37, to positively retain the latter in its loading station. The latch has a piston slidable in a cylinder in the carrier and is urged downwardly into its operative position by a spring 74. Its piston is raised, by application of hydraulic pressure against its bottom face, to release the carrier for swinging motion beyond its loading station.

The magazines 32 and 34, and the means for turning them step-by-step, are similar to those shown in Figs. 12 and 13 of aforementioned application Serial No. 22,436. In the present disclosure the magazines 32 and 34 (Fig. 2) each comprises a rotatable base 75 and six upright work supporting spools 76. The magazines are rotated step-by-step by a piston in cylinder 77, the piston rod 78 having pivoted spring backed pawls 79 engageable with pins 81 that project downwardly from the bases 75. The upper faces of the pawls are inclined, the arrangement being such that as the piston moves in the direction of the arrow on it in Figs. 2 and 13, the pawls engage the pins and rotate the magazines, clockwise in Figs. 1 and 2, through one-sixth of a revolution; while upon the opposite stroke of the piston the pawls are cammed downwardly by the pins 81 and slide idly past them so that the magazines are not turned. Suitable friction brake means (not shown) are provided to hold the magazines 32 and 34 against unintentional motion. Arranged to straddle the spool 76 at the rougher loading station is the lift fork 82 of an hydraulic elevator 39, this elevator comprising a stationary cylinder and a movable piston whose rod carries the fork.

The transfer magazine 33, shown in detail in Figs. 8, 9 and 10, comprises a pedestal 83 mounted on tray 31 and having a lateral extension for supporting one end of the cylinder 77. Rotatable in the pedestal is the journal part 84 of the magazine base which is built up of lower plates 85 and 86, tube 87, rings 88 and 89, and upper plate 90. Pins 81 carried by plate 85 are engageable by a pivoted pawl on the piston rod (like the pawls 79 that engage similar pins on magazines 32 and 34), for rotating the built-up base by one-sixth of a turn upon each stroke of the piston rod 78 in the direction of the arrow shown on it in Fig. 2. As shown in Fig. 9 a spring-backed pin 80, guided for movement relative to pedestal 83, is arranged to seat in notches in journal part 84 to thereby prevent unintentional rotation of the magazine. Slidable axially but non-rotatable in vertical bores in ring 89 are rods 91 to whose upper ends are attached work supporting spools 92. The attachment is such that the spools may have limited vertical motion but no rotation relative to the rods. Springs 93 constantly urge the spools to their upper limit positions relative to the rods (or conversely, urge the rods to their downward limit positions relative to the spools). Normally the spools rest on the upper surface of ring 89.

The lower ends of the rods 91 are grooved to receive the head 94 of the piston rod of an hydraulic elevator 96 which comprises a stationary cylinder supported on tray 31 and vertically reciprocable piston and piston rod. This elevator is arranged to lift a roughed work gear W′, at a testing station located between the rougher unloading station and the finisher loading station, into engagement with a die 97. The latter is carried by an arm 98 that is supported by a rod 99 and a screw 101. The rod is supported by the tray 31, while the screw 101 is part of a stationary assembly that extends axially through the rotating magazine assembly and that includes a rod 102, a cam plate 103 and a sleeve 104. The arm 98 has an open ended slot receiving the screw 101, so that, upon loosening the wing nut at the upper end of the screw, the arm may be swung about the axis of rod 99 away from the position shown to enable removal and replacement of a work gear W′ from the testing station.

A limit switch 105, and a vertically movable spring backed actuating plunger 106 therefor, are carried by the arm 98. The arrangement is such that when the elevator piston rises, the rod 91 and the spool 92 and the work gear at the testing station are raised into mesh with the die 97. If all the tooth spaces of the work gear have been cut to proper depth, so that the gear and die mesh to full depth, the plunger 106 will be raised slightly, closing the limit switch. If the gear has not been completely rough cut, it will not mesh to full depth with the die 97, and the switch will not be closed. The spring 93 will yield to reduce the impact of the gear against the die.

The elevator 41 (Figs. 2 and 13) is essentially like the elevator 96 in construction and is adapted to raise the gear W′, at the finisher loading station on the magazine 33, into the jaws 38′ of carrier 37′.

For the purpose of properly aligning the tooth spaces of work gear W′ with the teeth of die 97, stock dividing rods 107 are provided on the magazine 33. These rods also assure alignment of the gear with the finisher work gripping jaws 38′ such that when the gear is mounted on the spindle 26′ of the finisher its tooth spaces will be aligned properly with the finisher cutter 24′. The upper ends of the rods 107 are pointed and are of a diameter to fit easily in a tooth space of the gear. The rods are mounted to slide vertically in bores in plate 90 of the magazine, being urged downwardly relative to the latter by springs 108. The lower ends of the rods engage the upper surface of cam plate 103, the rods that appear in Fig. 8 being elevated by reason of being above rises of the cam. The cam is so designed that the rods 107 that are engaged with gears W′ at the testing station and the finisher loading station are elevated, to properly align the gears; while the rod at the rougher unloading station is lowered so it will not interfere with a gear at that station dropping onto the spool. As the latter rod subsequently rises its pointed end will enter the gear tooth space and may slightly rotate the gear into proper alignment.

In order to firmly seat each gear W′ on its spool 92 after it has been dropped at the rougher unloading station, a leaf spring 109 is mounted on member 111 of the stationary assembly that includes rod 102, cam 103, sleeve 104 and screw 101. As the gear turns step-by-step with the magazine, the leaf spring engages it and attempts to spin it on its spool, thereby effecting a firm seating.

In cases where the gears have a large pitch angle, or for other reasons the vertically disposed stock dividing elements 107 cannot enter the tooth spaces, the modified arrangement shown in Fig. 11 may be employed. In this, the rods 107′ that are actuated by cam 103′ are pivotally connected to L-shaped stock dividing elements 110. Each of these elements 110 is pivoted to a bracket 110′ carried by the upper plate 90 of the rotatable portion of magazine 33. The cam 103′ is so formed that the rods 107′ are elevated, lifting the elements 110 from engagement with the work at the loading station, but allowing the spring 108 to lower the rods and move the elements 110 into engagement with the work at other times.

Hereinbefore reference has been made to the normally open liimt switch 69 which is closed whenever plunger 65 rides on cam 66 and cam 68; and to the normally open limit switch 105 which is closed when the test station elevator 96 raises a properly rough cut gear W′. Other switches are also provided and are shown on the wiring diagram, Fig. 15, these including manually operated start and stop push button switches 112 and 113, and an automatic stop switch 114 which opens automatically, but only momentarily, when each cutting cycle is completed. There is a sliding base operated limit switch 115 (Figs. 12 and 13) having three movable contacts of which the upper two are closed and the lower is opened when, but only when, the sliding base 27 is "in," in cutting position. It will be understood that reference to "upper," "lower," "left," "right," etc., in connection with the electrical equipment has reference only to the positions on the wiring diagram, Fig. 15, and not to the actual positions on the machine.

There is another sliding base operated switch 116 which is closed when, but only when, the sliding base 27 is in its full out or loading position. A limit switch 117 (Figs. 2, 5 and 15) mounted on the work head 25 is operated by an abutment 118 on the carrier 37 to close its three contacts when, but only when, the loader slide 35 has moved to its full "in" position wherein the work is properly mounted on the work spindle. Another limit switch 119 mounted on the loader slide is operated, to close its three contacts, by a projection 121 on arm 61 when, and only when, the carrier 37 has swung to its limit position adjacent the spindle 26.

Mounted on the shaft of the sequence valve 47 is a cam 122 arranged to actuate limit switches 123, 124, and 125 which, as shown in Figs. 6 and 7, are mounted in the housing 126 for the valve, the numerals being primed since they represent parts of the finisher. The cam 122′ of the finisher actuates a fourth limit switch 127 (there being no corresponding limit switch for the rougher). The phase relationships of the lobes of the cams of the two units with the ports of the sequence valves are shown in Fig. 14. The lobe for closing normally open switch 123 is designated **123*a*; the lobe for closing normally open switch 124 being 124*a*; the lobes for opening normally closed switch 125 being 125*a*, 125*b*, and 125*c*. The lobe on the finisher sequence valve for opening normally closed switch 127 is designated 127*a***.

Other electrical equipment includes a main drive motor 128 which operates the cutter 24 and the indexing drive mechanism for the spindle 26 during the cutting portion of the machine cycle; a controller 129 for the main drive motor; and a four contact relay 131 of which the two right contacts open and the two left contacts are closed when the relay is energized. There is also a holding relay 132 arranged in shunt relationship to the normally open starting switch 112; and two latch type relays 133 and 134, these being of a kind whose movable contact remains in the position to which it is last operated. The motors for operating the sequence valves, hereinafter called loader motors, are designated 135.

The operation of the machine will now be described, with reference primarily to the wiring diagram, Fig. 15, the sequence valve development, Fig. 14, and the hydraulic diagrams, Figs. 12 and 13. It will be assumed that the machine is ready to start its cutting cycle, there being a blank and a rough cut gear chucked on the respective spindles 26 and 26', and a complete complement of blanks on magazine 32 and of roughed gears on transfer magazine 33.

(1) Start button 112 is momentarily closed establishing a circuit between main leads $L_1$ and $L_2$, of the three wire power supply, through the winding of the rougher motor controller 129 via the normally closed stop switch 113, the start switch 112, the left contact of now energized relay 131, the now closed upper contact of switches 115 and 115' (the sliding bases 27 and 27' are now in), and the now closed upper contacts of switches 117 and 119 (because the loader slide 35 is in and the swinging carrier 37 is at the spindle 26). The controller is thereby energized and the main rougher motor 128 started. Relay 131 is energized by a circuit from $L_1$ and $L_2$ through its second from left contact and the now closed automatic stop switch 114.

(2) Simultaneously with (1) the holding relay 132 is energized so that a shunt is established around start switch 112. Opening of the latter therefore has no effect.

(3) Simultaneously with (1) the main finisher motor 128' is started by the controller 129' being energized as the result of a circuit from $L_1$ and $L_2$ being closed through the switch 113, the contact of holding relay 132, the left contact of now energized relay 131', the middle contact of switch 115, and the middle contact of switches 115', 117' and 119', and the controller winding. Relay 131' is energized by a circuit from $L_1$ to $L_2$ through its second from left contact and automatic stop switch 114'.

(4) Simultaneously with (1) and (3) the right windings of relays 133 and 134 are energized, opening the relay contacts. These windings of 133 and 134 are respectively in parallel with the windings of relays 129 and 129'.

(5) The rougher and finisher go through their respective cutting cycles by reason of operation of motors 128 and 128', and at the conclusion of the cutting automatically open momentarily the switches 114 and 114', thereby deenergizing relays 131 and 131'. Once deenergized the opening of their second from left contacts prevents them from being reenergized when the switches 114 and 114' reclose. Opening of the left contacts of relays 131 and 131' disrupts the motor controller circuits described at (1) and (3), and thereby stops the main motors. However, the rougher and finisher do not necessarily complete cutting at the same time and so relays 131 and 131' may be deenergized at different times. Simultaneously with their respective deenergization the right windings of relays 133 and 134 are deenergized.

(6) When the two right contacts of both relays 131 and 131' are closed the loader motors 135 and 135' are started simultaneously. The circuit for rougher motor 135 is from $L_1$ through the contact of holding relay 132, the second from right contact of relay 131, the contact of relay 133, switches 125 and 124, the motor and return to $L_2$. The contact of relay 133 is closed because its left winding is energized by a circuit from $L_1$ through the second from right contact of relay 131, the right contact of relay 131', and the winding of 133 to $L_2$.

The circuit for finisher motor 135' is from $L_1$ through the second from right contact of relay 131', switch 127, the contact of relay 134, switches 125' and 124' and the motor to $L_2$. The left winding of relay 134 is energized by a circuit from $L_1$ through the second from right contact of relay 131', switch 127, the right contact of relay 131, and the left winding of 134 to line $L_2$.

(7—Rougher) The loader motor 135 turns sequence valve 47 to position A, i. e. until its ports along line A of Fig. 14 register with mating ports in the valve housing 126. The left and second from left ports in Fig. 14 (really continuous grooves around the valve) are in constant communication respectively with exhaust line 48 and pressure line 46, and through intra-valve passages communicate with the various exhaust and pressure ports of the valve. The pressure ports are shaded, the exhaust ports unshaded.

In moving to position A, the sequence valve first connects lines 136 and 137 respectively to pressure and exhaust, shifting shuttle valve 49 to the left and thereby putting the left and right ends of piston 42 respectively on pressure and exhaust. This starts out movement of the sliding base 27, and the switch 115 operates to close its bottom contact and open its upper two contacts. The circuit for motor 135 that was closed at (6) is opened when the sequence valve is at A, by cam lobe **124*a* then passing from beneath switch 124, unless by the time position A is reached the sliding base has been moved fully out with resulting closing of switch 116 which establishes a shunt around switch 124**.

In order to simplify the description in following instances of this kind, where the loader motor stops unless and until the next intended step in the sequence takes place, it will be assumed that the hydraulic operation is so delayed as to require the motor to stop. However it will be understood that in actual operation of the machine this is not necessarily the case, and that usually the operation of the loader motor will be continuous throughout the loading cycle.

(8—Rougher) As soon as the switch 116 closes, establishing that the sliding base 27 is in its out or loading position, the motor 135 operates continuously until the sequence valve reaches position B where the loader motor circuit is opened at switch 125 by operation of cam lobe **125*a*. In moving from A to B, the valve will first put line 138 on exhaust and lines 139 and 141 on pressure. This will shift piston 53 to close work gripping jaws 38 on the rough cut gear and operate device 29 to dechuck the gear from spindle 26. Also the pressure in line 139 will shift valve 64** (upwardly in Fig. 12) to one of its open positions.

Next in sequence the lines 142 and 143 are put on exhaust and pressure, respectively. Pressure is thereby applied to the cylinder chamber at the left of piston 54, while the chamber at the right is put on exhaust through valve 56 (now in its right position) to line 142. Accordingly the loader 35 moves out, to the left in Fig. 12, stripping the roughed gear off the spindle 26.

(9—Rougher) As the slide 35 reaches its full out position the bracket 55 engages the head on the stem of poppet valve 57 and opens the latter. Pressure from line 143 (and its branch 144) is applied through open valve 57 against the right end of shuttle valve 56, shifting it to the left inasmuch as its left end is exposed to exhaust line 142 through now open poppet valve 58. The result is that pressure from branch line 144 is now applied through shuttle valve 56, line 145 and now open spot valve 64, to the chamber above vane piston 63. This swings vane piston 62, and the carrier 37, toward its unloading station.

(10—Rougher) In moving to unloading station the carrier passes its loading station, at which the plunger 65 pivots the cam 66 but is not shifted by the cam. Also the latch 73 rides over detent 72, as is permitted by flexure of its spring 74. As the carrier approaches its unloading station the plunger 65 rides up on cam 68 and closes limit switch 69, thereby establishing a shunt circuit around now open switch 125 and causing the motor 135 to move the sequence valve on to position E. The carrier is arrested (by means not shown) in its limit position over its unloading station.

As the sequence valve starts to turn from B the cam lobe 125$a$ immediately passes from beneath the switch 125, allowing the latter to reclose so that the sequence valve moves on to position E. In so moving the valve first puts lines 138 and 139 respectively on pressure and exhaust, thereby actuating piston 53 to open jaws 38 with the result that the roughed gear carried by the jaws is dropped onto the spool 92 at the rougher unloading station. Simultaneously the valve 64 is shifted against plunger 65, but due to the shallowness of cam 68 the valve 64 remains partially open.

(11—Rougher) In further movement of the sequence valve, the lines 142 and 143 are put respectively on pressure and exhaust, applying pressure to the chamber beneath vane piston 63 and subjecting the chamber above the vane piston to exhaust via partially open valve 64, line 145, valve 56 (still in its left position) and lines 144 and 143. Valve 56 remains in its left position because poppet valve 58 is closed at this time so that pressure from line 142 is not effective against its left end. The pressure on vane piston 62 swings it and carrier 37 toward the loading station. The limit switch 69 is opened as soon as the carrier leaves its unloading station and plunger 65 rides off of cam 68. Hence the sequence valve stops in position E where the cam lobe 125$b$ again opens switch 125. However as the carrier approaches its loading station plunger 65 rides up on cam 66, shifting spot valve 64 to its closed position, thereby arresting the carrier, and simultaneously reclosing limit switch 69.

(12—Rougher) The carrier is now at its loading station and cannot move past it by reason of latch 73 abutting detent 72. Upon closing of switch 69 the circuit for motor 135 is re-established (from the contact of relay 133 through switch 69 and switch 116) thus causing movement of the sequence valve on to position G. As soon as it leaves position E the cam lobe 125$b$ allows switch 125 to re-close, establishing a shunt around switch 69 so that the next opening of the latter has no immediate effect.

The sequence valve as it turns from position E puts line 146 on pressure, thereby raising elevator 39. The top of the elevator piston is also subjected to pressure from line 136 but this is overcome by the greater area of the bottom of the piston. A new blank is therefore lifted on fork 82 into position between now open jaws 38. At the time elevator 39 raises, the shuttle valve 56 is still in its left position so that pressure from line 142 is cut off from the chamber at the right of piston 54. If the chamber at the left of the piston 54 were allowed to remain on exhaust, the impact of the elevated workpiece W entering jaws 38 might shift the loader slide 35 inwardly (to the right in Fig. 12). To obviate such difficulty a connection containing check valve 150 is provided between lines 146 and 143. Accordingly while pressure is applied to line 146 to raise elevator 82, pressure is also applied (via the check valve and line 143) to the chamber at the left of piston 54, thereby holding the loader slide against inward movement. At this time the line 143 is disconnected by sequence valve 47 from exhaust line 48 so that fluid under pressure cannot escape to exhaust. Wherever line 143 is connected to pressure by valve 47 the check valve 150 is closed.

(13—Rougher) As the sequence valve turns further toward position G, it puts lines 138 and 139 respectively on exhaust and pressure, thereby operating piston 53 to close the jaws 38 on the new blank, and simultaneously shifting valve 54 away from plunger 64 to its open position. However latch 73 holds the carrier in its loading position.

(14—Rougher) Next the sequence valve puts line 146 on exhaust, whereupon pressure in line 136 lowers the elevator.

(15—Rougher) Next in turning on toward position G the sequence valve puts line 147 on pressure, thereby releasing latch 73, allowing the carrier to swing on to its limit position adjacent the spindle 26. When position G is reached the cam lobe 125$c$ opens the loader motor circuit at switch 125. Switch 69 is also open at this time. When the carrier 37 reaches its limit position adjacent the spindle it opens poppet valve 58 and operates switch 119 to close its three contacts. Pressure from line 142 is thereby applied to the left end of shuttle valve 56 whose right end is on exhaust through the still open poppet valve 57 and lines 144 and 143. The shuttle valve therefore moves to the right, connecting pressure line 142 to the right cylinder chamber of piston 54 whose left cylinder chamber is now on exhaust via line 143. Accordingly the loader slide 35 is moved in, and the blank is thereby placed on the spindle 26. Limit switch 117 is operated to close its three contacts at this time.

While the foregoing operations (7—Rougher) through (15—Rougher) are taking place, the finisher is also in operation, as will now be described.

(7—Finisher) The sequence valve 47′ in moving to position A, puts lines 136′ and 137′ on pressure and exhaust respectively, operating the shuttle valve 49′ to the left to thereby effect out movement of sliding base 27′, and moving switch 115′ upwardly. Also the cylinder rod 78 is operated in the direction opposite the arrows to reset the ratchet means including pawls 79 for a subsequent advance of magazines 32, 33 and 34. The cam lobe 124′$a$ opens switch 124′ at position A, stopping the motor 135′, but when the sliding base is all the way out it closes switch 116′, thereby shunting 124′ and restarting the motor.

(8—Finisher) The sequence valve 47′ is now turned by the motor 135′ to position B where it stops because of opening of the motor circuit switch 125′ by cam lobe 125′$a$. In moving from A to B, line 138′ is put on exhaust, lines 139′ and 141′ on pressure; the work gripping jaws 38′ are closed up on the finish cut gear on spindle 26′, value 64′ is moved down against plunger 65′, and the gear is dechucked by device 29′.

Next in sequence lines 142′ and 143′ are put on exhaust and pressure respectively. By action of pressure against the cylinder of piston 54′ the loader slide 55′ is moved out, stripping the gear from the spindle.

(9—Finisher) In its full out position the loader slide opens poppet valve 57′, shuttle valve 56′ is shifted to the left since poppet valve 58′ is open at this time. As a result the valve 56′ now causes pressure to be applied from line 143′, branch line 144′ and line 145′ to the chamber above vane piston 63′, thereby swinging the carrier 37′ toward its unloading station. Exhaust from the chamber beneath vane 63′ is to line 142′ through valve 64′.

(10—Finisher) As the carrier approaches its unloading station the plunger 65′ rides up on cam 66′ and moves valve 64′ to closed position, interrupting the exhaust from the chamber beneath vane 63′ and thus stopping the carrier. Simultaneously the limit switch 69′ is closed by plunger 65′, establishing a shunt around now open switch 125′, and thereby rotating motor 135′ which now turns the sequence valve 47′ on to position C where the motor circuit is again reopened at switch 127 by cam lobe 127$a$.

(11—Finisher) As valve 47′ moves between positions B and C, line 147′ is put on pressure, elevating the roughed gear W′ at the test station into mesh with die 97. If the gear has been properly cut the limit switch 105 is closed, etablishing a shunt around now open switch 127, and causing the motor to move the sequence valve on to position D. If the limit switch 105 does not close, signifying an improperly roughed gear which might damage the finishing cutter 24′, the loader will remain stopped and the machine will stop with the rougher at stage (15—Rougher). The operator will cut off the electric power to the pumps 44, 44′ at a switch (not shown), thereby eliminating hydraulic pressure and allowing the elevator 96 to lower; and then replace the defective gear with a properly cut one, as hereinbefore described. The pump motor switch and the start button 112 then will be reclosed, whereupon the loading sequence will be resumed, the valve 47' moving on to the position D.

(12—Finisher) At position D the loader motor circuit is opened at switch 125' by cam lobe 125'b. Before this position is reached lines 138' and 139' will have been placed on pressure and exhaust respectively. This will operate piston 53' to open jaws 38' and drop the finished work gear from them onto the unloading or finished parts magazine 34. The pressure difference between lines 138' and 139' will also act, with a slight lag due to a restrictor 147, to shift valve 64' to its open position away from plunger 65'. This will allow resumption of exhaust from the chamber beneath vane 63' and the now empty carrier will move on to its loading station above transfer magazine 33 where it will be stopped by a suitable abutment (not shown). The restrictor 147 is provided to insure the gear dropping from the jaws before the swing of the carrier is resumed.

(13—Finisher) As the carrier approaches its loading station the plunger 65' will ride up on cam 68', closing limit switch 69' which then shunts the switch 125' that is opened by cam 125'a in position D of the sequence valve. This enables the motor 135' to move the valve on from position D to position F. As this occurs the line 146' is first put on pressure, raising the elevator 41 and thereby lifting the roughed gear that is disposed above the elevator into position between the open jaws 38'.

(14—Finisher) Next in sequence the lines 138' and 139' are put on exhaust and on pressure, respectively, causing the jaws to close on the gear and the valve 64' to be moved (to its closed position) against plunger 65'.

(15—Finisher) Next the line 146' is put on exhaust so that the elevator 41 lowers, and, thereafter, the lines 142' and 143' are respectively connected to pressure and to exhaust. Fluid from line 142' by-passes now closed valve 64' through a spring backed ball check valve 149 into the chamber beneath vane 63', while fluid may exhaust from the chamber above the vane through line 145', past valve 56' (now in its left position), and lines 144' and 143'. The carrier 37' will accordingly be swung toward the finisher work spindle 26'. In this swing the plunger 65' pivots cam 66' and moves idly past it. As soon as the plunger leaves cam 68' the limit switch 69' opens. Hence when the sequence valve reaches position F the cam lobe 125'c opens switch 125' and so causes the motor to stop.

As the carrier completes its swing toward the spindle 26' it closes three-pole switch 119' and opens valve 58'. As a result of the latter the shuttle valve 56' is moved to the left. This applies pressure from line 142' through valve 56' to the right cylinder chamber of piston 54'. As the opposite cylinder chamber is on exhaust via line 143', the loader slide 35' is moved in, to the right in Fig. 12, placing the roughed gear on spindle 26' and closing switch 117'.

(16) When the limit switches 117 and 119 of the rougher and limit switches 117' and 119' of the finisher are all closed, the loader motors 135 and 135' are operated to move their respective sequence valves from position G and F to the terminal position H. The circuit for the rougher extends from the second from right contact of relay 131, the contact of relay 133 through the middle contacts of switches 117 and 119, the upper contacts of switches 117' and 119' and switch 116 to motor 135. This motor is stopped in position H by cam lobe 123a closing switch 123 which energizes relay 131 by a circuit from $L_1$ through switch 123, lower contact of switch 115, switch 114, and the relay winding to $L_2$. Accordingly the second from right contact of relay 131 is opened breaking the circuit to motor 135. The closing of the second from left contact of relay 131 establishes a holding circuit for the latter, which presists until switch 114 is opened.

As the sequence valve 47 approaches terminal position H the cam lobe 124a closes switch 124 establishing a shunt around switch 116 in the circuit just described, so that subsequent opening of 116 has no effect. As position H is approached line 141 is put on exhaust, operating chucking device 29 to chuck the blank on the work spindle 26. When terminal position H is reached lines 136 and 137 are put on exhaust and pressure, respectively. This shifts shuttle valve 49 to the right, which applies pressure through line 46 to the right face of piston 42 and exposes the left face of the piston to exhaust line 48. Accordingly the sliding base moves in to cutting position. As the base starts in the switch 116 opens, when full in the switch 115 operates to close its upper two contacts and open its lower contact.

Similarly the finisher loader motor 135' is energized to move valve 47' from F to H by a circuit through the second from right contact of relay 131', switch 127, the contact of relay 134, the lower contacts of switches 117, 119, 117' and 119' and switch 116' to the motor. When position H is reached the cam lobe 123'a closes switch 123' and thereby, through energization of relay 131', opens the motor circuit at the second from right contact of that relay. As the sequence valve 47' approaches position H line 141' is put on exhaust so that the device 29' is actuated to chuck the roughed gear W' on spindle 26'; and in position H the lines 136' and 137' are put on exhaust and pressure, respectively, to effect "in" motion of the sliding base 27'. Switch 116' is opened and switch 115' actuated to its lower position to close its upper two contacts and open its lower contact. Also the piston rod 78 is shifted in the direction of the arrows to index magazines 32, 33 and 34.

(17) When both switches 115 and 115' are in their lower position, which means that the loading cycle of both the rougher and finisher is concluded, the main motors 128 and 128' are restarted and a new cutting cycle begins. This occurs because the motor controllers 129 and 129' are energized by a closing of the circuits described at (1), (2) and (3). Simultaneously with energization of relays 131 and 131' at step (16) the left windings of the respective relays 133 and 134 are deenergized, and when the relays 129 and 129' are now energized the right windings of 133 and 134 are also energized. Accordingly the contacts of 133 and 134 are opened.

The machine will continue to operate automatically with loading cycles following cutting cycles, and vice versa, as long as the magazine 32 is kept supplied with new blanks and the cutter 24 roughs the blanks to proper depth. As pointed out hereinbefore, during each complete cycle of the machine the roughing and finishing units are synchronized at three points: (*a*) when their cutting cycles end, so that switches 114 and 114' close; (*b*) during the loading cycles when the sequence valves 47 and 47' are in positions G and F respectively, and switches 125 and 125' are opened; and (*c*) when the loading cycles end, and switches 115 and 115' are moved to their lower positions.

The foregoing disclosure of the invention has been made by way of illustration and example, and not by way of limitation, for those skilled in the art will recognize that various changes and modifications may be made without departing from the inventive principles that have been disclosed, and hence there is no intention to limit the invention except as may be required by the appended claims.

We claim:

1. In a gear cutting machine, first and second units each comprising a work spindle, means for cutting gear teeth on a work piece that is mounted on the spindle, and a carrier operable during each loading cycle to carry a work piece from the spindle to an unloading station and then to carry another work piece from a loading station to the work spindle; a transfer device for conveying work pieces from the unloading station of the first unit to the loading station of the second unit; sequence control means for each unit to cause the cutting means and the spindle of the unit to operate through a cutting cycle upon the completion of each loading cycle and the carrier of the unit to operate through a loading cycle upon the completion of each cutting cycle; and means controlled conjointly by both sequence control means for operating the transfer device while both carriers are away from their respective stations at the device.

2. A gear cutting machine comprising first and second units each including a work spindle, means for cutting gear teeth on a workpiece mounted on the spindle, and a carrier operable during each loading cycle to carry a workpiece from the spindle to an unloading station and then to carry another workpiece from a loading station to the work spindle; a transfer device for conveying workpieces from the unloading station of the first unit to the loading station of the second unit; sequence control means to cause the cutting means and the spindles of the units to operate through a cutting cycle upon the completion of each loading cycle, the carriers of the units to operate through a loading cycle upon the completion of each cutting cycle, and the transfer device to operate while both carriers are away from their respective stations at said device; and means for testing each work piece to determine whether it has been properly cut by said first unit, said testing means being arranged to operate on a work piece in said transfer device and being operable to stop the machine upon finding an improperly cut work piece.

3. A gear cutting machine as characterized by claim 2, in which the testing means comprises a die having projections for engagement in the tooth spaces of the work piece, means for effecting relative movement of the die and the work piece to interengage them, and sensing means for determining upon such movement whether they mesh properly.

4. A gear cutting machine as characterized by claim 2 in which there is a die having projections for meshing at predetermined depth in the tooth spaces of a properly cut work piece, means for effecting relative movement of the die and the work piece for interengaging them while the work piece is in the transfer device at a position intermediate the unloading station of the first unit and the loading station of the second unit, said means for effecting relative movement being arranged to operate during the loading cycle, and means operable to stop the machine upon failure of the die and work piece to mesh to said predetermined depth when such relative movement is effected.

5. A gear cutting machine comprising first and second units each including a work spindle, means for cutting gear teeth on a workpiece mounted on the spindle, and a carrier operable during each loading cycle to carry a workpiece from the spindle to an unloading station and then to carry another workpiece from a loading station to the work spindle; a transfer device for conveying workpieces from the unloading station of the first unit to the loading station of the second unit; sequence control means to cause the cutting means and the spindles of the units to operate through a cutting cycle upon the completion of each loading cycle, the carriers of the units to operate through a loading cycle upon the completion of each cutting cycle, and the transfer device to operate while both carriers are away from their respective stations at said device; and means for testing each work piece to determine whether it has been properly cut by said first unit, said testing means being arranged to operate on a work piece in the transfer device at a position intermediate the unloading station of the first unit and the loading station of the second unit, said testing means being arranged to operate during the loading cycle and being operable to stop the machine upon finding an improperly cut work piece.

6. In a gear cutting machine, first and second units each comprising a work spindle, means for cutting gear teeth on a work piece that is mounted on the spindle, and a carrier operable during each loading cycle to carry a work piece from the spindle to an unloading station and then to carry another work piece from a loading station to the work spindle, and sequence control means to cause the cutting means and the spindle to operate through a cutting cycle upon the completion of each loading cycle and to cause the carrier to operate through a loading cycle upon the completion of each cutting cycle; means for synchronizing the sequence control means of the two units at a predetermined point in at least one of the cutting and loading cycles; a transfer device for conveying work pieces from the unloading station of the first unit to the loading station of the second unit; and means for operating the device while the two sequence control means are substantially in synchrony and while both carriers are away from their respective station at the device.

7. A gear cutting machine as characterized by claim 6, in which there is a loading magazine at the loading station of the first unit, and means for operating said loading magazine simultaneously with operation of the transfer device.

8. A gear cutting machine as characterized by claim 6, in which there is a loading magazine at the loading station of the first unit, the means for operating the transfer device also operates the loading magazine, and the last-mentioned means is operated by the sequence control means of the second unit.

9. A gear cutting machine as characterized by claim 6, in which the synchronizing means comprises means for stopping the sequence control means of either unit upon such control means reaching a given phase in its operating cycle in advance of the control means of the unit reaching a predetermined phase in its operating cycle, and for restarting the stopped control means when the control means of the other unit reaches said predetermined phase.

10. A gear cutting machine as characterized by claim 6, in which the transfer device is rotatable upon an upright axis and has a plurality of upright elements for supporting work pieces, one such element being disposed at the unloading station of the first unit when another thereof is at the loading station of the second unit, locating means on the transfer device adjacent each element for engaging in a tooth space of a work piece on the element for determining its angular relationship to the transfer device, and means engageable with each work piece, as the transfer device rotates to carry the work piece from said unloading station, to urge it into proper register with said locating means.

11. A gear cutting machine as characterized by claim 10, in which an element of the transfer device is at an intermediate station when other elements are at said loading and unloading stations, a die disposed above said intermediate station having projections proportioned and aligned to mesh at predetermined depth with the teeth of a properly formed work piece at said station when such work piece while held by the locating means is elevated into engagement with the die, means for so elevating the work piece during the loading cycle, and means for stopping the machine if the work piece when so elevated fails to mesh to said predetermined depth with the die.

12. A gear cutting machine as characterized by claim 6, in which the transfer device is rotatable upon an upright axis and has a plurality of upright elements for supporting work pieces, one element being at an intermediate station when other elements are respectively at the unloading station of the first unit and the loading station of the second unit, locating means on the device adjacent each element for engaging in a tooth space of a work piece on the element for maintaining the angular relationship of the work piece with the magazine, a die disposed above the intermediate station having projections proportioned and aligned to mesh to predetermined depth the teeth of a work piece at the intermediate station when such work piece while held by the locating means is elevated into engagement with the die, means for elevating the work piece, and sensing means for determining whether the work piece when so elevated meshes to said predetermined depth with the die.

13. A gear cutting machine as characterized by claim 12, in which the die is mounted on the machine for removal from such disposition above the intermediate station, to enable the replacement of a work piece in the transfer device at said station.

14. In a gear cutting machine, first and second units each comprising a work spindle, means for cutting gear teeth on a work piece that is mounted on the spindle, and a carrier operable during each loading cycle to carry a work piece from the spindle to an unloading station and then to carry another work piece from a loading station to the work spindle; a transfer device for conveying work pieces from the unloading station of the first unit to the loading station of the second unit, said device being rotatable about an upright axis and having upright elements for supporting the work pieces; sequence control means to cause the cutting means and the spindles of both units to be operated through a cutting cycle upon the completion of each loading cycle and to operate the carriers of both units through a loading cycle upon the completion of each cutting cycle, means operated by said sequence control means to rotatably advance the transfer magazine while both loading members are away from their respective stations at the device, the device during each such advance carrying a work piece from the unloading station of the first unit to an intermediate station and carrying another work piece from an intermediate station to the loading station of the second unit; a work piece testing die disposed above one such intermediate station; elevating means for elevating work pieces upon their supporting elements at said one intermediate station and at the loading stations, to engage the work pieces respectively with the die and the carriers of the respective units; the elevating means at the loading stations being operable by the sequence control means of the respective units and the elevating means at said one intermediate station being operated by the sequence control means of one unit; and means operable to stop the machine upon failure of the work piece at said one intermediate station to properly mesh with said testing die when elevated into engagement therewith.

15. A gear cutting machine comprising first and second units each comprising a work spindle, means for cutting gear teeth on a workpiece that is mounted on the spindle, and a carrier operable during each loading cycle to carry a workpiece from the spindle to an unloading station and then to carry another workpiece from a loading station to the work spindle; a transfer device for conveying workpieces from the unloading station of the first unit to the loading station of the second unit, the transfer device being rotatable about an upright axis and having upright elements to support the work pieces, a locating member movably supported upon the device adjacent each element for registration with a tooth space of a work piece on the element, and a stationary cam for effecting movement of the locating member, to and from a position wherein it may engage the work piece, as the transfer device rotates, the cam being so formed that each locating member is away from said position when the adjacent element is at the unloading station of the first unit; and means for operating the transfer device, by advancing it about said upright axis, while both carriers are away from their respective stations at said device.

16. In a gear cutting machine, a transfer device rotatable about an upright axis and having upright elements to support work pieces, a locating member movably supported upon the device adjacent each element for registration with a tooth space of a work piece on the element, and means for effecting movement of the locating member, to and from a position wherein it may engage the work piece, in phase relationship with rotation of the device.

17. A gear cutting machine as characterized by claim 16 in which each locating member is pivoted to the transfer device, and the means for effecting movement of the locating elements comprises a stationary cam, a cam follower carried by the device for each locating element and operatively connected with the locating element, and spring means for biasing each locating element toward said position wherein it may engage the work piece.

18. In a gear cutting machine, a work spindle, a carrier pivoted to swing during each loading cycle first in one direction to carry a work piece from the spindle to an unloading station and then in the opposite direction to carry another work piece from a loading station to the spindle, said loading station being disposed in the path of the carrier between the unloading station and the spindle, fluid pressure operated means for swinging said carrier, fluid pressure operated means for transferring a work piece to said carrier at said loading station, a stop for arresting the carrier at said loading station during such transfer of a work piece, fluid pressure operated means for moving said stop between operative and inoperative positions, and sequence control means to control the application of fluid pressure to said fluid pressure operated means.

19. In a machine for cutting toothed work pieces, an electrically operated sequence control means and means controlled by the latter for carrying a work piece to a cutting station; a die adapted to mesh to predetermined depth with a properly shaped work piece, means controlled by the sequence means for urging the work piece into a position to mesh with the die prior to being carried to the cutting station, an electric switch in the electrical operating circuit for the sequence means, said switch being opened by the sequence means when the work piece is urged to said position, another switch connected in parallel relation with the first mentioned switch and so arranged as to be closed when the work piece meshes to said predetermined depth with the die.

20. In a machine for cutting toothed work pieces, a gaging device comprising a work piece supporting element, a die provided with projections for meshing to predetermined depth in the tooth spaces of a properly shaped work piece, the number and the circumferential spacing of said projections corresponding to those of the intertooth spaces of the workpieces, means supporting the die for movement to and from a station above said element, and means for elevating the element to bring a work piece thereon into mesh with the die when the latter is at said station.

21. A machine for cutting toothed work pieces, comprising a roughing unit and a finishing unit; each unit comprising an hydraulically operated carrier for conveying a work piece from a loading station to a cutting station and thence to an unloading station, and an electric motor rotated hydraulic sequence valve for controlling the operation of the carrier; means to transfer a work piece from the unloading station of the roughing unit to the loading station of the finishing unit; and electrical control means, including switch means operated by the carriers and other switch means operated upon rotation of the sequence valves, for stopping the sequence valve motor of either unit at a predetermined point in the operating cycle of the unit until the other unit has reached a corresponding point in its cycle.

22. A machine for cutting toothed work pieces, comprising a roughing unit and a finishing unit; each unit comprising an hydraulically operated carrier for conveying a work piece from a loading station to a cutting station and thence to an unloading station, and an electric motor rotated hydraulic sequence valve for controlling the operation of the carrier; and electrical control means, including switch means operated by the carriers and other switch means operated upon rotation of the sequence valves, for stopping the sequence valve motor of either unit at a predetermined point in the operating cycle of the unit until the other unit has reached a corresponding point in its cycle.

23. In a machine for cutting toothed workpieces, a workpiece supporting element, a die provided with projections for meshing to predetermined depth in the tooth spaces of a properly shaped workpiece, the number and the circumferential spacing of said projections corresponding to those of the intertooth spaces of the workpieces, power operated means including a yieldable element for effecting relative movement of the supporting element and the die in the direction of the workpiece axis to bring them into and out of mesh, and means cooperating with the die and supporting element for sensing whether such mesh is to full depth.

References Cited in the file of this patent

UNITED STATES PATENTS

| | | |
|---|---|---|
| 1,829,263 | Carlsen | Oct. 27, 1931 |
| 1,886,543 | Hansen | Nov. 8, 1932 |
| 2,107,543 | Miller | Feb. 8, 1938 |
| 2,120,966 | Clark | June 21, 1938 |
| 2,150,313 | Bauer | Mar. 14, 1939 |
| 2,287,677 | Fraumann et al. | June 23, 1942 |
| 2,448,426 | Galloway | Aug. 31, 1948 |
| 2,570,589 | Phillips | Oct. 9, 1951 |
| 2,589,475 | Carlsen et al. | Mar. 18, 1952 |
| 2,713,277 | Kaul | July 19, 1955 |